March 29, 1938. J. E. FREEBORN 2,112,487
VARIABLE SPEED POWER TRANSMISSION APPARATUS
Filed May 29, 1935 11 Sheets-Sheet 1

INVENTOR
James Edward Freeborn
BY
Frank Ackerman
ATTORNEY

March 29, 1938.  J. E. FREEBORN  2,112,487
VARIABLE SPEED POWER TRANSMISSION APPARATUS
Filed May 29, 1935  11 Sheets-Sheet 2

INVENTOR
James Edward Freeborn
BY
Frank S. Appleman,
ATTORNEY

March 29, 1938.    J. E. FREEBORN    2,112,487
VARIABLE SPEED POWER TRANSMISSION APPARATUS
Filed May 29, 1935    11 Sheets-Sheet 3

Inventor:
James Edward Freeborn,
By Frank S. Appleman,
Attorney,

March 29, 1938. J. E. FREEBORN 2,112,487
VARIABLE SPEED POWER TRANSMISSION APPARATUS
Filed May 29, 1935 11 Sheets-Sheet 5

Fig. 9.

INVENTOR
James Edward Freeborn
BY
ATTORNEY

March 29, 1938. J. E. FREEBORN 2,112,487
VARIABLE SPEED POWER TRANSMISSION APPARATUS
Filed May 29, 1935 11 Sheets-Sheet 6

Inventor:
James Edward Freeborn,
by Frank S. Appleman,
Attorney

March 29, 1938. J. E. FREEBORN 2,112,487
VARIABLE SPEED POWER TRANSMISSION APPARATUS
Filed May 29, 1935 11 Sheets-Sheet 9

March 29, 1938.   J. E. FREEBORN   2,112,487
VARIABLE SPEED POWER TRANSMISSION APPARATUS
Filed May 29, 1935   11 Sheets-Sheet 10

Inventor:
James Edward Freeborn,
by Frank S. Appleman,
attorney.

March 29, 1938.  J. E. FREEBORN  2,112,487
VARIABLE SPEED POWER TRANSMISSION APPARATUS
Filed May 29, 1935   11 Sheets-Sheet 11

INVENTOR,
James Edward Freeborn,
ATTORNEY.

Patented Mar. 29, 1938

2,112,487

UNITED STATES PATENT OFFICE 2,112,487

VARIABLE SPEED POWER TRANSMISSION APPARATUS

James Edward Freeborn, London, England, assignor to Freeborn Power Converters Limited, London, England, a British company Application May 29, 1935, Serial No. 24,122
In Great Britain June 16, 1934

13 Claims. (Cl. 74—260)

This invention relates to variable speed power transmission mechanism and has for its chief object to provide means whereby the change from one gear ratio to another will be effected automatically when the conditions are such that the change should take place. The improved mechanism is particularly useful for motor propelled road vehicles but it is applicable also to other uses.

The gearing which is employed in the present invention is of the epicyclic type whereof one member is at all times free to rotate in one sense but is prevented from rotating in the opposite sense by ratchet mechanism. The locking together of two of the members of such a gearing causes it to rotate as a whole without producing any change of speed as between the driving and driven members. Hereinafter this action of locking or clutching together the two members will be referred to as "disabling" the gearing, because it suppresses the speed reducing or torque increasing function of the gearing.

According to the principal feature of the present invention at least one train of gearing of the epicyclic type is provided with means for disabling it automatically under the joint control of speed responsive and torque responsive elements.

Preferably the epicyclic train, or each such train, is a speed reducing train and is disabled by an increase of speed or a decrease of torque. One such train of epicyclic gearing will provide a direct drive and one sub-ratio. Two or more sub-ratios may be provided for by adding one or more further gear trains, the several gear trains being in series with one another and each being provided with disabling means as aforesaid.

The term "epicyclic gearing" is to be understood as including not only the type of gearing in which an internally toothed annulus, to which the ratchet mechanism is applied, and which gears with planet pinions, but also the type in which there is no internally toothed annulus but instead there are two sunwheels of different diameters meshing with planet wheels also of different diameters, the ratchet mechanism being applied to the planet carrier. In this second type of gearing the planet wheels do not execute a planetary motion when the gearing is effective to provide a reduced speed, but nevertheless such gearing is functionally the same as the type first mentioned in which the axes of the planet pinions revolve around the axis of the sun pinion.

The speed responsive element of the disabling means, or of each disabling means, tends to disable the gear train as the speed increases, while the torque responsive element opposes this action in proportion to the amount of torque. Thus, gear-changing occurs automatically in accordance with variations in speed and torque. Under certain circumstances the speed will be insufficient, or the torque too great, to disable the gear train which will therefore be in operation to reduce the speed and increase the torque of the driven shaft. If the speed should increase or the torque be reduced a condition will be reached at which the train will be disabled, that is to say, all its three members will be locked together with the result that the speed of the driven shaft will be the same as the speed of the driving shaft. In a multi-speed gearing having more than one epicyclic train that one of the trains which rotates at the highest speed and therefore transmits least torque will be disabled first as the speed increases or as the torque decreases. If a further increase of speed or reduction of torque occurs the disabling means of the next train will come into action, and so on throughout the series if there are more than two trains.

The disabling means consists preferably of a friction clutch normally not in engagement but arranged to lock together two of the members of the epicyclic train when it is engaged. This clutch is under the control of a centrifugal mass, such as a centrifugal lever or levers, which, when it moves radially outwards under centrifugal action, causes the clutch to engage. A lost-motion device is provided, in association either with the driving member or with the driven member of the epicyclic train, which is so connected with the centrifugal mass that the torque opposes the centrifugal action. Thus speed and torque act in opposition in controlling the clutch.

The invention also comprises improvements in ratchet mechanism for use with epicyclic gearing the objects of which are to minimize or eliminate noise during overrunning and to absorb shocks due to the ratchet mechanism coming into action.

A number of different embodiments of the invention are illustrated in the accompanying drawings, in which.

Referring now to Figures 1 to 6 which illustrate a motor vehicle gearbox providing three sub-ratios, a direct drive and provision for reverse drive at will, the engine shaft is shown at 20 and the final driven shaft which is connected to the back axle through the usual Cardan shaft is indicated at 22. This shaft 22 has an enlarged portion 24 within the gearbox on which is splined a dog-clutch member 26 operated by a fork 28 which is connected to a suitable operating lever, not shown. This clutch member 26 is shown in the disengaged or free position; when it is moved to the right its clutch teeth 30 engage with clutch teeth 32 on a sleeve 34 carried by a central shaft 36 which receives its drive from the gearing presently to be described. The teeth 30 and 32 remain in engagement for all forward speeds including the direct drive.

Figure 4:
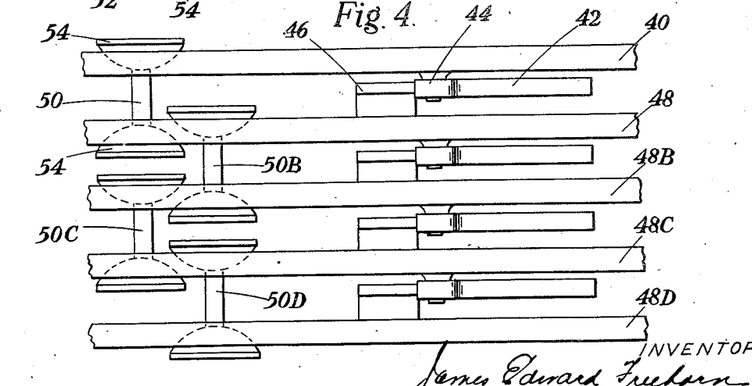
Figures 4, 5 and 6 are explanatory diagrams.
Figure 5:
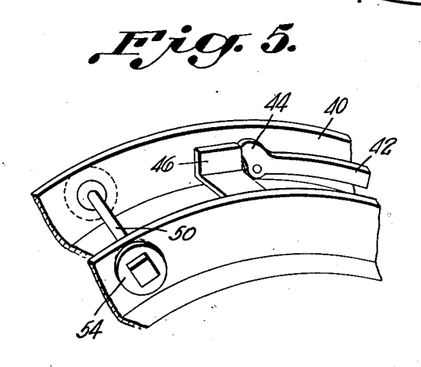

The engine shaft 20 carries a flywheel 38 coupled to a disc 40 which is free to rotate on the shaft 36. Three centrifugal levers 42 are pivoted to the disc 40 near its periphery, each lever being provided with a short outwardly extending arm 44. Each of these arms abuts against the side of a block 46 carried by another disc 48 similar to the disc 40. When the disc 40 is rotated in the direction of the arrow in Figure 2 the arms 44 press against the blocks 46 thereby driving the disc 48. The lever 42 thus tends to be swung inwards against the action of centrifugal force which tends to swing it outwards. When it does swing outwards under centrifugal force the arm 44 moves forward in the direction of rotation, thus displacing the disc 48 forwards in relation to the disc 40. The discs 40 and 48 are connected together by six swivelling links 50 which extend through holes 52 in the discs and are provided with part-spherical heads 54 at their ends which are seated in spherically curved recesses in the outer sides of the plates. When the parts are in the positions shown in Figure 2, that is to say, when the centrifugal levers 42 are in their innermost positions, the links 50 are perpendicular to the discs as shown in Figures 4 and 5. When the centrifugal levers 42 move outwards to the positions shown in Figure 6 thereby advancing the disc 48 in relation to the disc 40, the links 50 assume an oblique position clearly shown in Figure 6 thereby drawing the disc 48 towards the disc 40.

Figure 2:
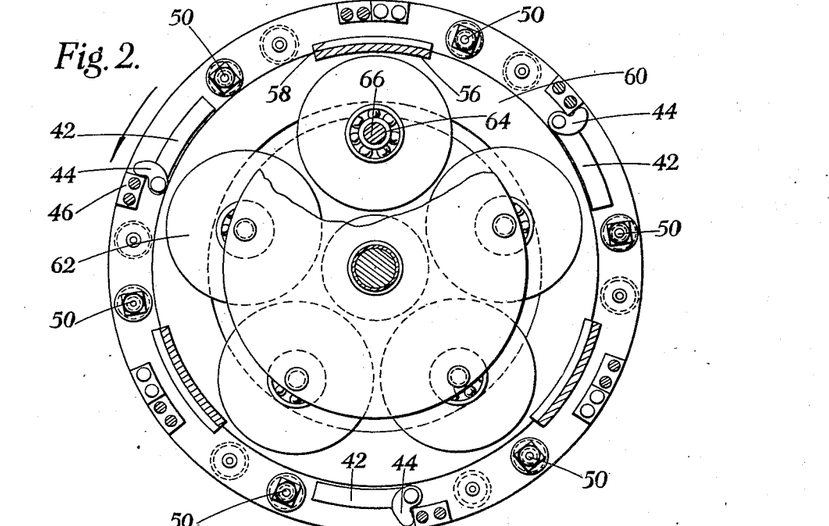
Figure 2 is a sectional end elevation on the line II in Figure 1.

The disc 48 is provided with arcuate projections 56 seated within arcuate projections 58 on the disc 40. Four flat rings 60 are housed between the two discs 40 and 48, being notched on their peripheries to engage the projections 56. These rings 60 are thus free to move in the axial direction but are constrained to rotate with the disc 48.

Interleaved with the rings 60 are a number of freely rotatable discs 62. These are arranged in six sets of three each. Each set of three discs is mounted on a ball-bearing 64 carried by a pin 66. The six pins 66 are fixed to a carrier 68, being situated near the periphery of this carrier and spaced around it uniformly. The carrier 68 is keyed to the shaft 36.

Figure 6:
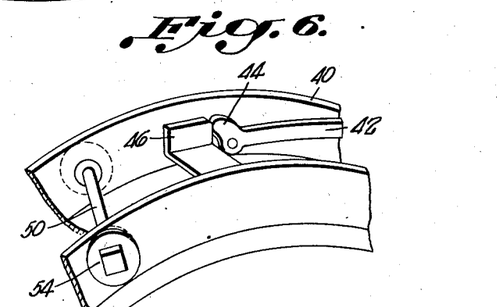

It will now be apparent that when the discs 40, 48 assume the position shown in Figure 6, being pulled towards one another by the links 50, the rotatable disc 62 will be clamped between the rings 60 and thereby prevented from rotating. The carrier 68 and therefore the shaft 36 will be clutched to the engine shaft 20. The clutch consisting of the discs 48, the rings 60 and the discs 62 is therefore an automatic direct drive clutch. If the reaction torque between the plates clutch 40 and 48 is such as to maintain the centrifugal levers 42 in the position shown in Figure 2 against the action of centrifugal force, the clutch will be disengaged. If, however, the conditions of speed and torque are such that the centrifugal levers 42 can move outwards, then the disc 48 is advanced in relation to the disc 40 and the clutch is engaged. It will be seen, therefore, that the clutch is under the joint control of torque responsive and speed responsive devices, these devices acting in opposition to one another.

Figure 1:
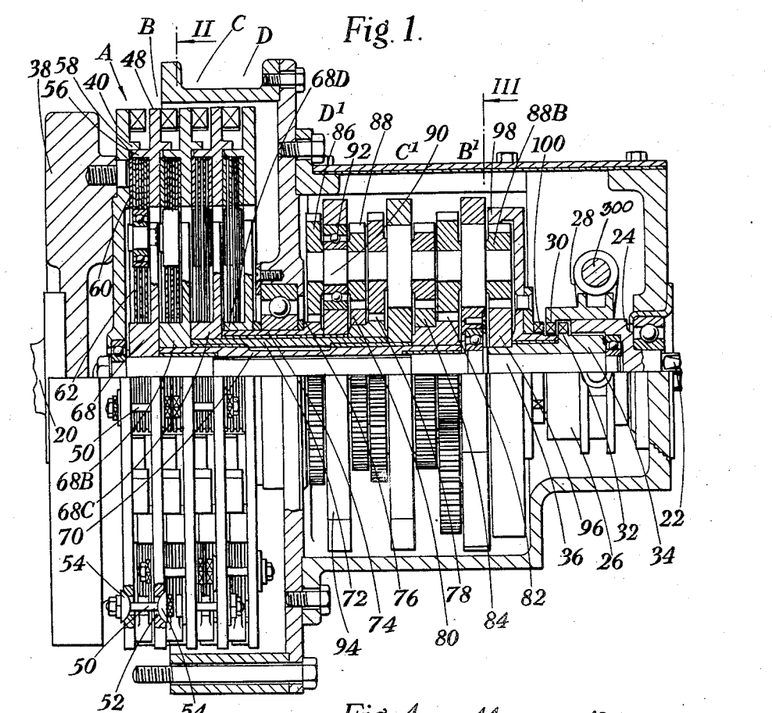
Figure 1 is a sectional side elevation of one form of gearing according to this invention providing three sub-ratios and a direct drive.

The clutch just described will be designated generally by the letter A. There are three further clutches B, C and D side by side with the clutch A and identical with it in construction. The corresponding parts of the clutches B, C and D will be referred to by the same reference numerals as are used for the parts of the clutch A but with the suffix B, C of D as the case may be. No further description of the clutches themselves is necessary except that the discs 48B, 48C and 48D are all connected together in pairs by links 50B, 50C, 50D.

The carrier 68B constituting the driven member of the clutch B is keyed to a sleeve 70 which is free to rotate upon the shaft 36. The carrier 68C is keyed upon a sleeve 72 which surrounds and is free to rotate upon a sleeve 70 and, finally, the carrier 68D is keyed upon an external sleeve 74 surrounding and free to rotate upon the sleeve 72.

The sleeve 74 carries a sun pinion 76 forming the driving member of an epicyclic gear train $D^1$. The sleeve 72 carries a sun pinion 78 which is the driving member of an epicyclic gear train $C^1$ and also a sun pinion 80 larger than the similar pinions 76, 78 which is the driven member of the gear train $D^1$. Similarly, the sleeve 70 carries a sun pinion 82 similar to the pinions 76, 78 constituting the driving member of the third epicyclic gear train $B^1$ and also a larger sun pinion 84 which is the driven member of the gear train C¹.

The three gear trains are similar in all respects and the intermediate member of each train consists of four pairs of differential planet pinions 86, 88. The pinions 86, 88 of each pair are carried by a spindle 90 and the four spindles are mounted in ball-bearings 92 in a planet carrier 94 which is free to rotate in the forward direction, that is the direction of the arrow in Figure 2, but is prevented from rotating in the reverse direction by a ratchet mechanism which will be described hereinafter. In each train the pinion 86 which gears with the driving sun pinion (76, 78, 82 respectively) is larger in diameter than the pinion 88. Each train therefore acts as a speed reducing gear when it is in action, that is to say, when the reactions are such that the planet carrier 94 tends to rotate backwards but is prevented from doing so by the ratchet mechanism. If the members of the gear train are prevented from rotating relative to one another, that is to say, if the driving and driven sun pinions are clutched or locked together, then the gear train rotates in the forward direction as a whole.

The smaller planet pinions 88B of the gear train B¹ mesh with a final driven sun pinion 96 which is mounted upon the sleeve 34 carrying the forward clutch teeth 32. The pinions 88B also mesh with an internally toothed annulus 98 mounted to rotate freely upon the sleeve 34 and carrying clutch teeth 100 which are engaged by the clutch teeth 30 on the sleeve 26 when this sleeve is moved to the left from the neutral position shown in Figure 1.

Assuming now that the clutch teeth 30, 32 for forward drive are in engagement, let it be assumed that the speed of the engine shaft is low and the torque resistance applied to the driven shaft 20 is high. The plates 40, 48 . . . will all be in the relative positions shown in Figures 4 and 5 and therefore all the clutches A, B, C, D will be disengaged. The carriers 68, 68B, 68C, 68D will therefore not be driven. As the speed increases the centrifugal levers 42 will tend to move outwards, this action, however, being opposed by the torque which exists between the various pairs of discs 40, 48. . . . This torque is greatest between the discs 40, 48 of the clutch A and least between the corresponding discs of the clutch D. Consequently, the clutch D will engage first. Thus, the carrier 68D will be driven, thus transmitting drive to the gear train D¹. Since the carriers 68A, 68B 68C are free to rotate the reaction between the sun pinion 76 and the driven shaft 22 will urge all three planet carriers 94 backwards and the ratchet mechanism will take up this reaction. The three gear trains therefore act in series and the driven shaft 22 will therefore rotate at its slowest speed, the gear ratio being the product of the individual ratios of the three trains.

It will now be clear that if the speed of the engine increases a condition will be reached at which the centrifugal levers 42 of the clutch C can move outwards, the torque being assumed to remain constant. The clutch C will therefore be engaged and the carrier 68C will be driven. The clutch D, of course, remains in engagement and the result is in effect that the driving sun pinion 76 is locked to the driven sun pinion 80. Thus, the gear train D¹ is disabled, being constrained to rotate forwards as a whole, its ratchet mechanism overrunning. The whole drive will now be taken by the driving sun pinion 78 of the gear train C¹. Only the gear trains C¹, B¹ are now effective and the speed of the driven shaft 24 is therefore higher. If the speed increases still further, the torque remaining constant, the clutch B will presently be engaged. Thus, the sun pinions 78, 84 are also locked together, the gear train C¹ rotates forward as a whole, the whole drive is taken by the sun pinion 82 and the gear train B¹ only is in action. Obviously, a still further increase of speed will cause the clutch A to be engaged, thereby disabling the gear train B¹. The whole of the epicyclic gearing is now out of action and a direct drive is obtained through the clutch A.

The operation of the gearing has been described by reference to increasing speed with constant torque. It will be clear that the same sequence of operations will occur if the speed remains constant and the torque decreases. It will also be obvious that the reverse sequence takes place during decrease of speed with constant torque or increase of torque with constant speed. In these two latter cases the gear ratio will be progressively increased. Thus, the gear ratio automatically adjusts itself to the requirements of the running conditions.

The same sequence of operations is followed when the gearing is in reverse, the drive in this case being transmitted from the final gear train B¹ through the internally toothed annulus 98 and the clutch teeth 30, 100. The only difference is that all the speeds are lower.

Figure 3:
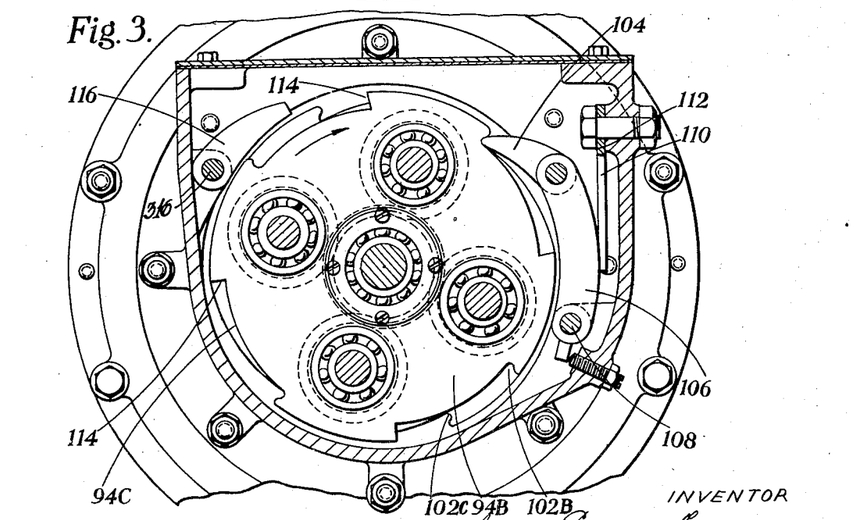
Figure 3 is a sectional end elevation on the line III in Figure 1.

The ratchet mechanism which prevents the backward rotation of the planet carrier 94 is shown in Figure 3. The planet carrier 94 is formed with notches 102 in its periphery which constitute ratchet teeth. These teeth are engaged by a pawl 104 which is pivoted to the end of an arm 106 pivoted at a fixed point 108 in the casing. A blade spring 110 presses against the arm 106 thereby maintaining the pawl 104 in engagement with the notched edge of the planet carrier 94. It will be seen that when the driving reaction tends to rotate the planet carrier in the direction of the arrow, that is to say, in the reverse direction, the arm 106 will be urged to the right thereby bending the spring 110. As this action proceeds, however, the curved right-hand edge of the arm 106 rolls upon the bent spring 110 and therefore makes contact with it progressively nearer to its anchorage 112. The resistance to backward rotation of the planet carrier will therefore increase rapidly. This ratchet mechanism therefore acts to absorb any shock which might be caused by the engagement of a tooth with the pawl.

The planet carrier 94B differs from the other two planet carriers in that the notches are, as it were, double-ended, providing tooth faces 114 facing forwardly. These tooth faces cooperate with a second pawl 116 which is normally held out of engagement but is moved into engagement with the tooth faces 114 by a connection between it and the fork 28 which is operative when the sleeve 26 is moved to the left to bring the teeth 32 into engagement with the teeth 100 or reverse drive. This additional pawl 116 operated in this manner is necessary because when the reverse drive is in action the reaction upon the planet carrier 94B is in the forward direction, that is to say, anticlockwise as seen in Figures 2 and 3.

Figure 16:
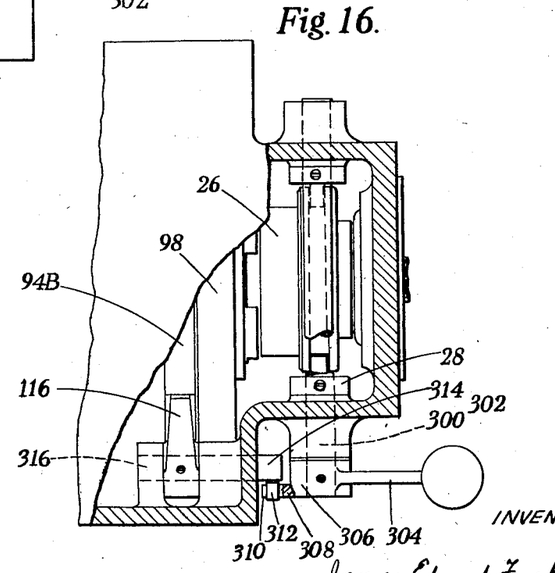
Figure 16 is a detailed sectional view in plan of part of Figure 1.
Figure 17:
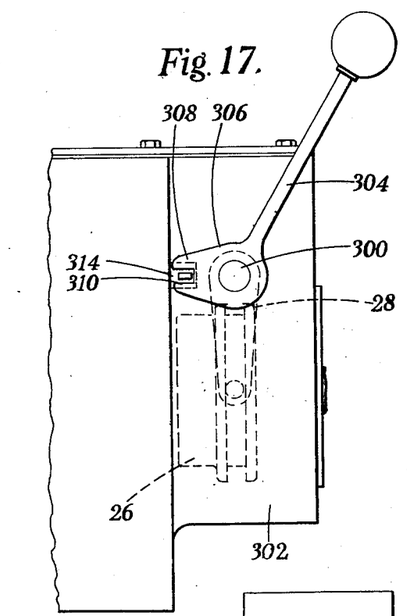
Figure 17 is a side elevation of part of Figure 1.

The connection between the pawl 116 and the fork 28 is shown in Figures 16 and 17. The fork 28 is secured to a spindle 300 which extends through the casing 302 and carries at its outer end a hand lever 304. The boss 306 of this hand lever is formed with an extension 308 formed with a notch 310 within which is situated an arm 312 projecting from the protruding end 314 of the spindle 316 to which the pawl 116 is secured. When the hand lever 304 is moved to the right to move the sleeve 26 to the left for the reverse drive, the arm 312 is moved upwards thereby swinging the spindle 316 in the clockwise direction as seen in Figure 3, thus causing the pawl 116 to engage one of the tooth faces 114.

Figure 7:
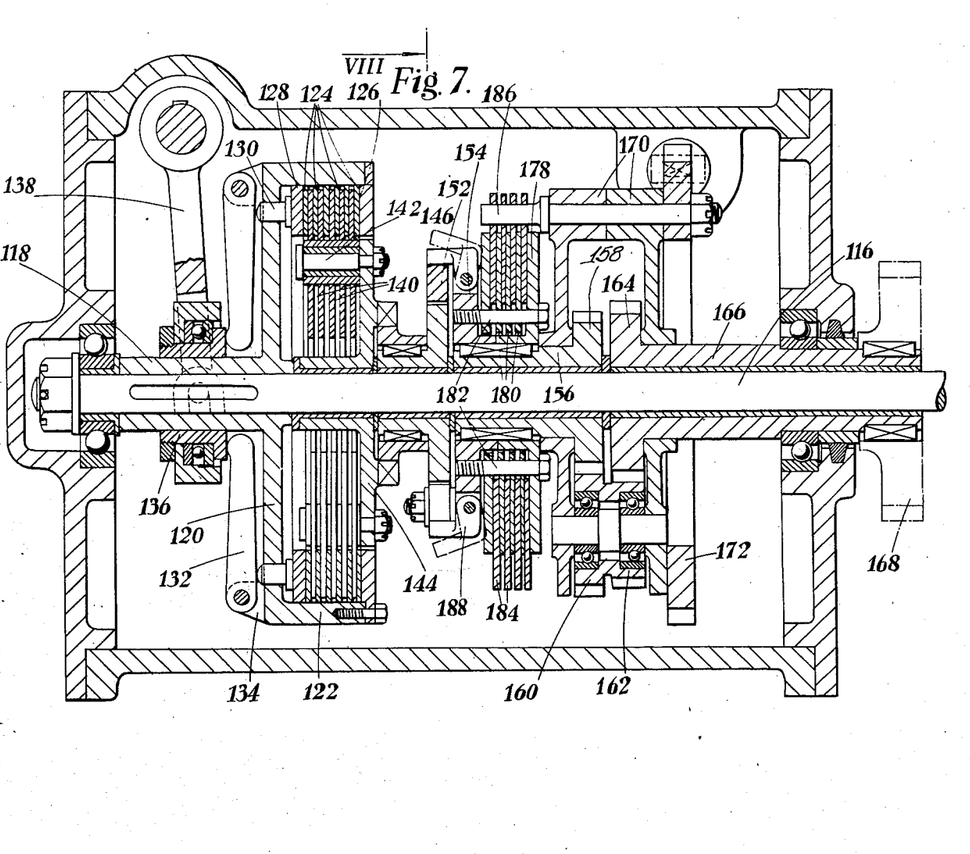
Figure 7 is a sectional side elevation of a modified form of the invention providing one sub-ratio and a direct drive.
Figure 8:
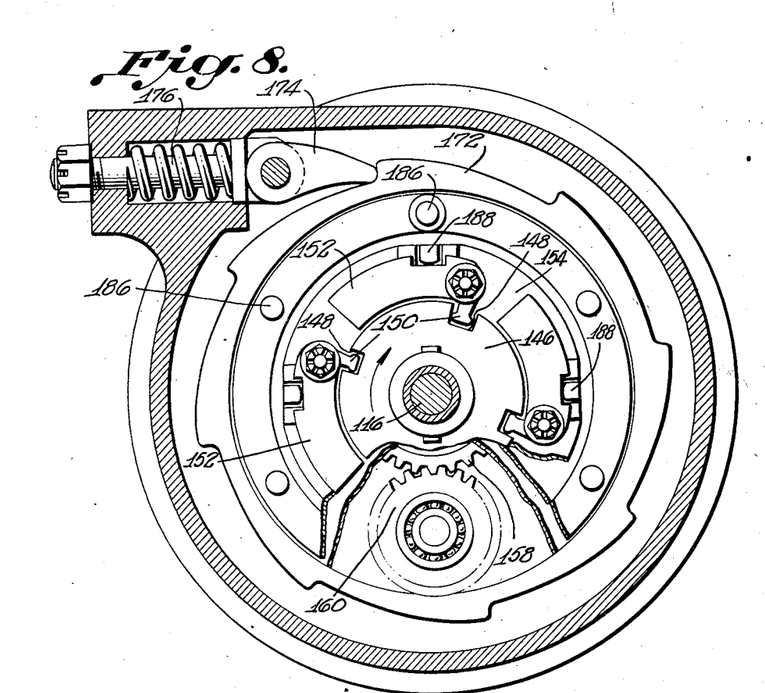
Figure 8 is an end elevation in section on the line VIII in Figure 7 with parts broken away.

Figures 7 and 8 illustrate a gearbox which is not specially adapted for use in motor vehicles in the form illustrated but is useful where a direct drive and one sub-ratio are required. This modification also incorporates a manually operated clutch.

The driving shaft 116 has keyed to it a sleeve 118 formed with a wide flange 120 carrying a cylindrical extension 122. A set of six flat rings 124 similar to the rings 60 (Figure 1) are mounted within the extension 122, being constrained to rotate with this extension but being free to move in the axial direction. They are confined between an annular plate 126 secured to the edge of the extension 122 and a movable pressure plate 128. This pressure plate is operated through buttons 130 by means of levers 132 pivoted to lugs 134 at the periphery of the flange 120. The extremities of the levers 132 are operated by a sliding sleeve 136 actuated by a manually operated fork lever 138. It will be evident that by swinging this fork lever 138 towards the clutch the pressure plate 128 will be moved to the right thereby crowding the rings 124 together.

Interleaved between the rings 124 are five freely rotatable discs 140 mounted upon spindles 142 secured to a carried 144. When the rings 124 are pressed together as described above the discs 140 will be prevented from rotating about the spindles 142 and therefore the carrier 144 will be clutched to the driving shaft.

The carrier 144 is connected to a disc 146 the edge of which is provided with four notches 148 which receive short inwardly extending arms 150 forming part of a set of four centrifugal levers 152. These levers are pivoted to the edge of a flange 154 keyed to a sleeve 156 mounted to rotate freely upon the shaft 166 and carrying a sun pinion 158. This sun pinion meshes with the larger pinion 160 of a pair of differential planet pinions the other pinion of which, 162, meshes with a driven sun pinion 164 carried by a sleeve 166 which is the driven member of the gearbox. The extension of this sleeve beyond the casing may carry a gearwheel 168 or any other motion transmitting device such as a belt pulley. There are a number of pairs of planet pinions 160, 162 spaced uniformly around a planet carrier 170 mounted to rotate freely upon the sleeves 156, 166. Attached to the planet carrier is a ratchet wheel 172 the teeth of which engage a pawl 174 pivoted to a spring-pressed plunger 176.

The sleeve 156 carries in addition to the flange 154 a second flange 178. Between the two flanges is a set of friction plates 180 which are notched to receive bolts 182 which constrain them to rotate with the two flanges and therefore with the driving sun pinion 158. Interleaved with these friction plates is another set of friction plates 184 which are notched to receive studs 186 carried by the planet carrier 170.

The flange 154 has pivoted to it bent levers 188 which overlie the centrifugal levers 152. When the centrifugal levers move outwards the bent levers 188 are swung into a position indicated in dotted lines in Figure 7. This movement causes them to press against the adjacent friction plate 180 thereby causing all the pressure plates to be pressed together.

It will now be clear that when the driving shaft is rotated in the direction of the arrow in Figure 8 and the clutch 124, 140 is engaged, the drive to the sun pinion 158 will be transmitted through the sides of the notches 148, the arms 150, the centrifugal levers 152, the flange 154 and the sleeve 156. The torque reaction will therefore tend to maintain the centrifugal levers 152 in their innermost positions. The centrifugal force exerted on these levers will, however, oppose the torque reaction and if the conditions are such that these levers can move outwards sufficiently to engage the clutch 180, 184, the planet carrier 170 will be locked to the sleeve 156 and therefore to the driving sun pinion 158. The ratchet wheel 172 will therefore rotate forwardly, overrunning the pawl 174, and the sleeve 166 will rotate at the same speed as the driving shaft 116. If now the torque should increase or the speed should decrease sufficiently to disengage the clutch 180, 184, then the planet carrier 170 will tend to rotate backwards, it will be held against backward rotation by the pawl 174, the epicyclic gearing 158, 160, 162, 164 will be operative and the sleeve 166 will be driven at a lower speed than the driving shaft 116.

Figure 9:
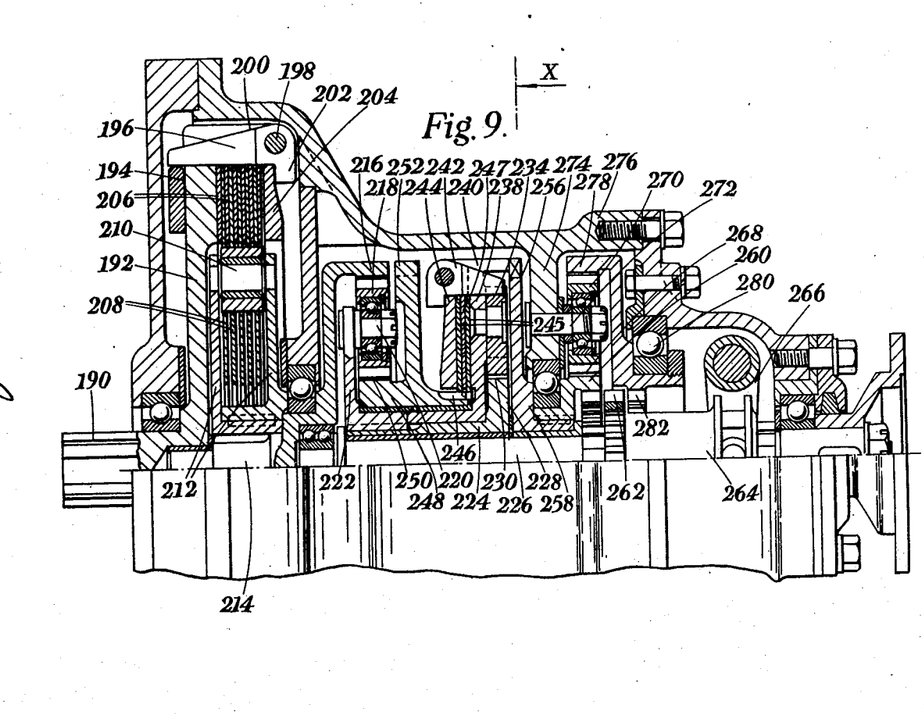
Figure 9 is a sectional side elevation of another modified form of the invention providing one sub-ratio, a direct drive and a reverse drive.
Figure 10:
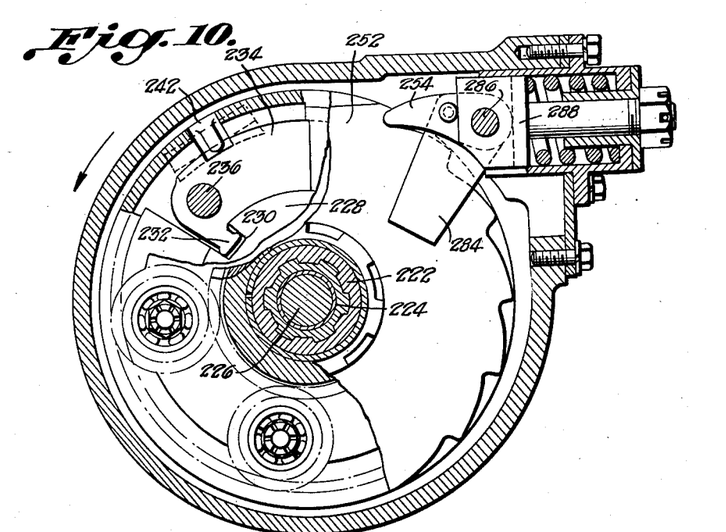
Figure 10 is a sectional end elevation on the line X in Figure 9 with parts broken away.

Figures 9 and 10 illustrate a gearbox providing a direct drive, one sub-ratio and a reverse drive, and incorporating also a centrifugal clutch in lieu of the manually operated clutch of Figures 7 and 8. The driving shaft 190 carries a large flange 192 to which are pivoted centrifugal levers 194, bearing upon which are the extremities of bell crank levers 196 pivoted at 198 between lugs 200 extending from the edge of the flange 192. The inwardly extending shorter arms 202 of these bell crank levers bear upon an annular plate 204. Between the flange 192 and the plate 204 is a set of six flat rings 206 which are notched at their outer edges to receive the lugs 200, so that they are constrained to rotate with the flange 192. Interleaved with the rings 206 are a number of sets of five rotatable discs 208 similar to the discs 62, Figure 1, mounted to rotate freely upon a spindle 210 carried by a carrier 212. It will be seen that when the shaft 190 is not rotating the clutch constituted by the rings 206 and the rotatable discs 208 is disengaged, but that as the speed of the driving shaft increases the centrifugal levers 194 will move outwards progressively, thereby causing the arms 202 acting through the plate 204 to press together the rings 206 and the discs 208, thereby preventing the latter from rotating. Thus, the carrier 212 rotates at the same speed as the driving shaft 190 when the speed of this shaft reaches a certain value.

This carrier is keyed to a shaft 214 coaxial with the driving shaft 190 and carrying an internally toothed annulus 216. Meshing with this annulus is a series of four planet pinions 218 mounted to rotate about spindles 220 carried by a planet carrier 222 splined to a sleeve 224 mounted to rotate freely upon a driven shaft 226 coaxial with the shafts 190 and 214. The sleeve 224 has a flange 228 at the end remote from the planet carrier 222 and this flange is provided with notches 230 in which are situated the inwardly extending short arms 232 of centrifugal levers 234. These levers are pivoted at 236 to a disc 238 mounted to rotate freely upon the sleeve 224 and provided with lugs 240. Between these lugs are pivoted bell crank levers 242 which transfer the outward motion of the centrifugal levers 234 to a pressure plate 244 between which and the disc 240 are three clutch plates the two outer ones 245 of which are notched at their outer edges to receive the lugs 240 and the inner one, 247, is splined as at 246 to a sleeve 248 carrying a sun pinion 250 meshing with the planet pinions 218 and carrying also a ratchet wheel 252.

Assuming now that the clutch 245, 247 is disengaged it will be seen that if the internally toothed annulus 216 rotates in the direction of the arrow in Figure 10 the planet carrier 222 will tend to be turned in the same direction. The reaction on the sun pinion 250 will be in the reverse direction but it will be prevented from rotating in this direction by a pawl 254. The planet carrier will thus rotate counterclockwise at a speed lower than the speed of the annulus 216. The sleeve 224, the flange 228 and the disc 238 will therefore be driven at the reduced speed. The lugs 240 are connected by a clutch tooth connection 256 to a member 258 rotating freely on the shaft 226 and keyed to a clutch member 260. Normally this clutch member 260 is engaged by clutch teeth 262 on a sliding sleeve 264 operated by a fork 266, but it is shown disengaged in the drawing. The sleeve 264 is splined to the driven shaft 226 and the result will be that the shaft 226, which is the output shaft of the gearbox, will be driven at a reduced speed through the epicyclic gearing 216, 218, 250.

If now the speed increases, the torque remaining the same, the centrifugal levers 234 will move outwards, and this motion will be transmitted by the levers 242 to the plate 244, thereby engaging the clutch 245, 247. This will lock the sun pinion 250 to the disc 238 and therefore to the planet carrier 222. The epicyclic gearing will then rotate counterclockwise as a whole, the ratchet wheel 252 overrunning the pawl 254. Thus, the driven shaft 226 will rotate at the same speed as the driving shaft 190, it being assumed, of course, that the centrifugal slutch 206, 208, is engaged. As in the constructions previously described, an increase of torque will tend to disengage the clutch, and an increase of speed will tend to engage it. Thus, the disabling of the epicyclic train will occur if the torque falls below a certain amount with a constant speed or if the speed rises above a certain value with constant torque. When either of these conditions is reversed the epicyclic train will automatically come into action again.

The clutch member 260 is provided with teeth 268 meshing with pinions 270 rotating on spindles 272 fixed to a partition 274 forming part of the casing 276. These pinions 270 also mesh with an internally toothed annulus 278 mounted to rotate in ball bearings 280 and provided with clutch teeth 282. By manipulating the fork 266 the clutch teeth 262 can be engaged with the clutch teeth 282, whereupon the driven shaft 226 will be rotated clockwise. Thus, a reverse drive can be obtained.

The pawl 254, Figure 10, is pivoted at 286 to a spring-pressed plunger 288. Thus, the shock of engagement of the pawl 254 is cushioned by spring action as in the construction shown in Figure 8. Side-plates 284 on the pawl 254 embracing the ratchet-wheel 252, and in light frictional engagement therewith through a film of lubricating oil, tend to hold the pawl out of engagement with the ratchet teeth during overrunning and also tend to re-engage the pawl with the teeth when the ratchet wheel begins to rotate backwards.

Figure 11:
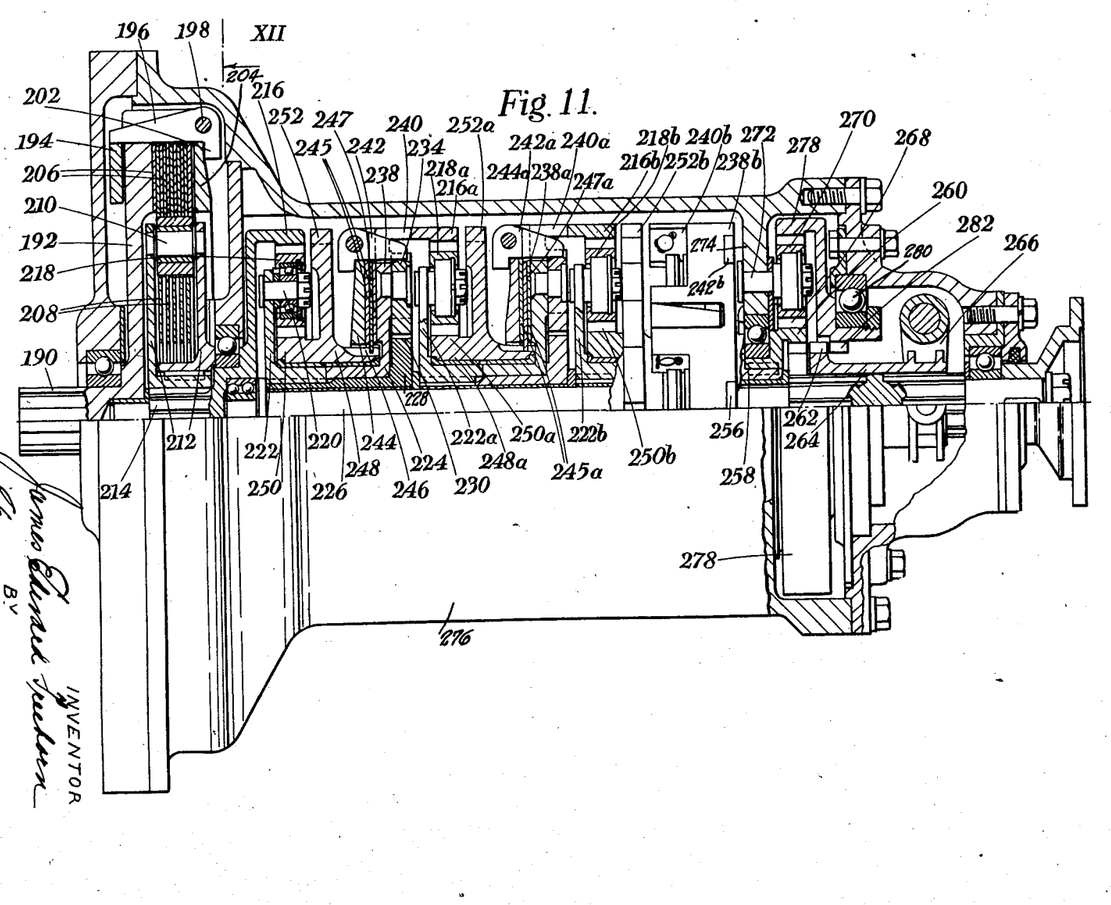
Figure 11 is a sectional side elevation of a form of the invention differing from that shown in Figure 9 in that it provides three sub-ratios in addition to a direct drive and a reverse drive.
Figure 12:
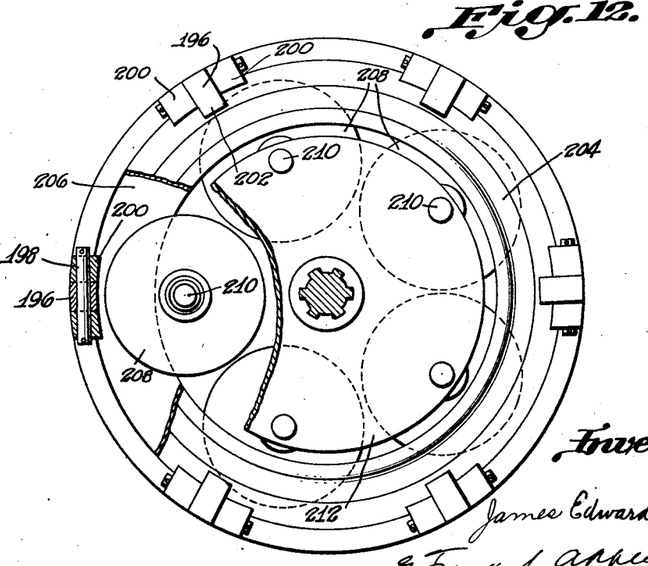
Figure 12 is a sectional end elevation on the line XII in Figure 11 with parts broken away, the casing of the gearing being removed.

The construction shown in Figures 11 and 12 differs from that shown in Figures 9 and 10 only in that there are three epicyclic trains similar to the train 216, 218, 250, and three automatically operated clutches similar to the clutch 245, 247. The same reference letters are used in Figure 11 as have been used in connection with Figure 9 but the corresponding parts of the second and third epicyclic trains and clutches have the reference numerals followed by a and b respectively. In order to follow the operation of this mechanism it is only necessary to point out that the part 238 instead of being directly connected to the part 258 as in Figure 9 is connected to the internally toothed annulus 216a of the second epicyclic train. Similarly the part 238a of the second clutch mechanism is connected to the internally toothed annulus 216b of the third epicyclic train. The connection between the part 238b of the third train and the part 258 which carries the clutch member 260, is exactly as described with reference to Figure 9.

It will be appreciated that this mechanism operates in a manner analogous to that already described with reference to Figure 1. If the running conditions are such that all three clutches 245, 247 are disengaged then all three epicyclic trains are in operation and the driven shaft rotates at its lowest speed. An increase of speed or a reduction of torque will cause the clutch of the first or left-hand train to be engaged, thereby disabling this train. A further change of the same character will presently cause the second train 216a, 218a, 250a to be disabled, followed by the disabling of the third train 216b, 218b, 250b. When this occurs the direct drive is obtained. Changes of running conditions in the reverse order will cause the right-hand train to come into action followed by the second train, and finally the first train, whereupon the driven shaft is once more rotating at its slowest speed in relation to the speed of the driving shaft.

Figure 12 illustrates the parts of the centrifugal clutch 206, 208 in end elevation as seen from the right and this figure may be taken also as an illustration of the similar clutch of Figure 9.

Figure 13:
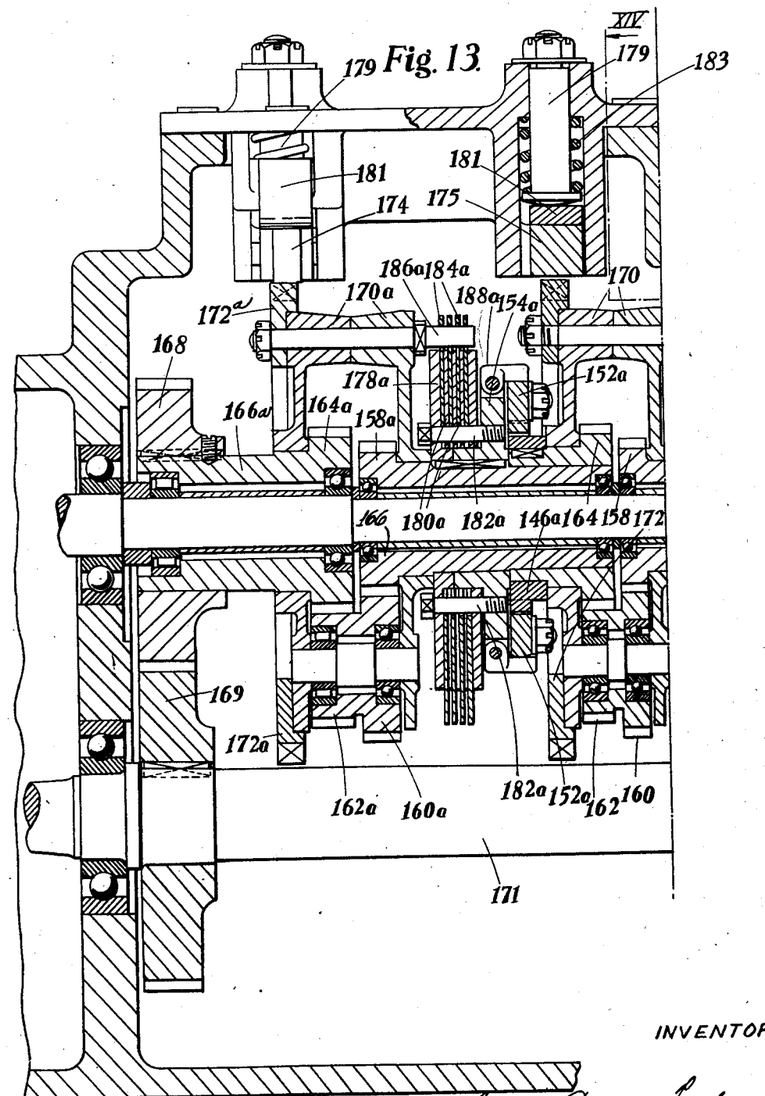
Figure 13 is a sectional side elevation of yet another embodiment of the invention providing two sub-ratios in addition to a direct drive.
Figure 13A:
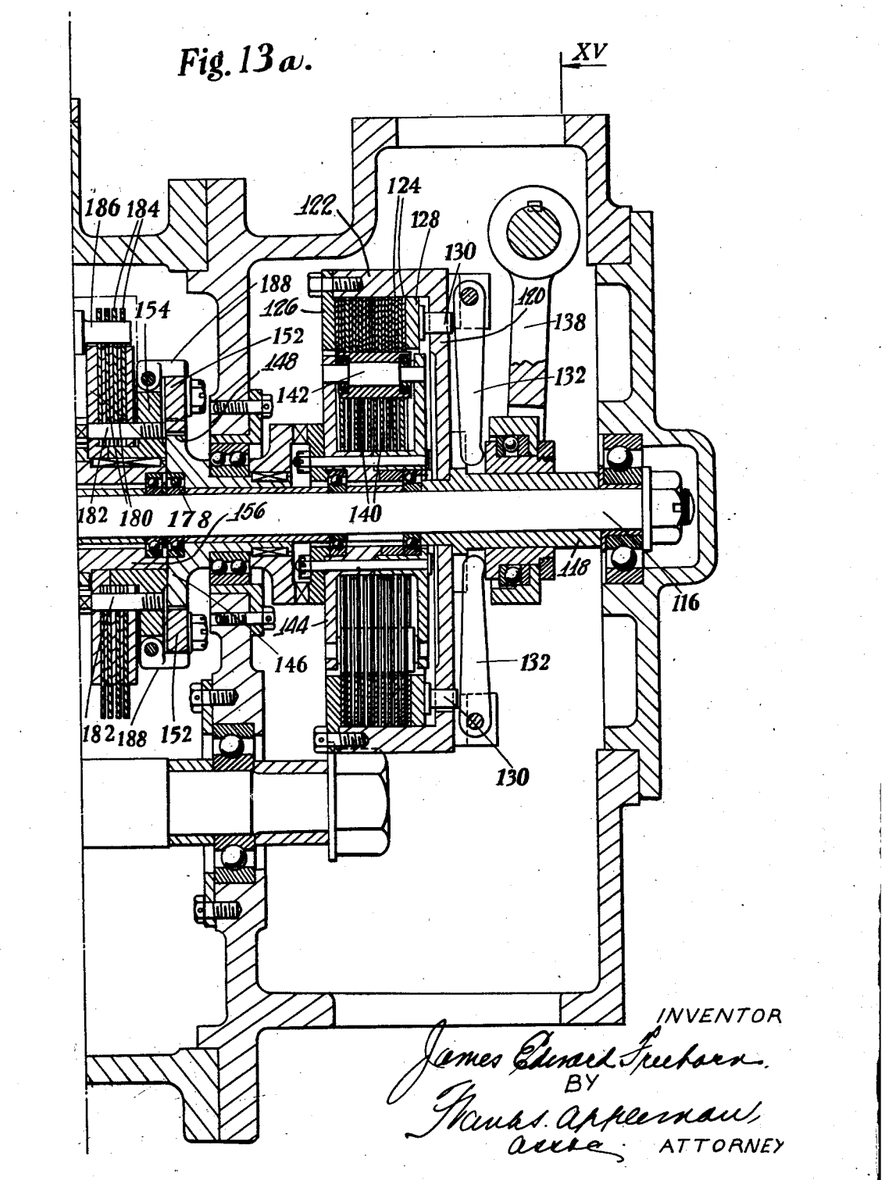
Figure 13a is a sectional view of that part of the same machine which could not be illustrated in Fig. 13.
Figure 14:
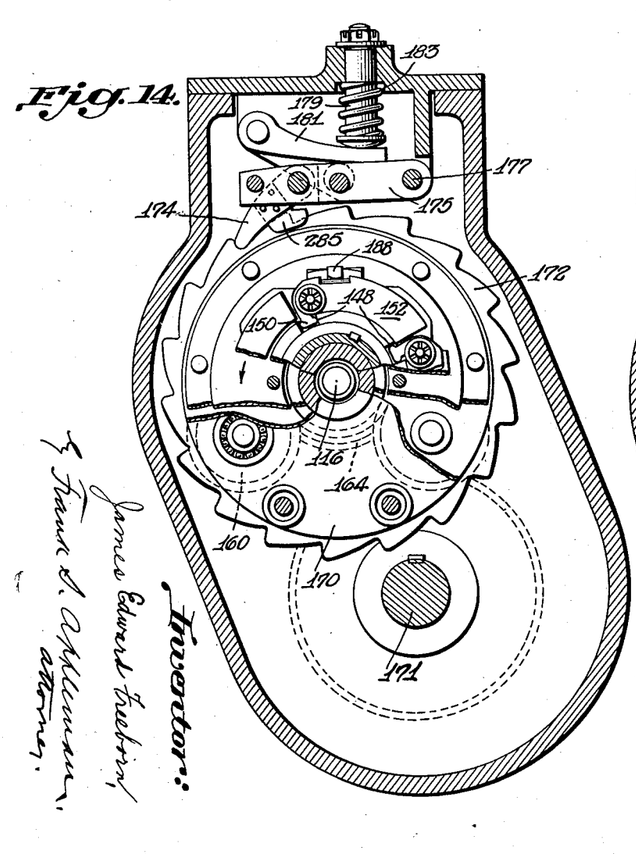
Figure 14 is a sectional end elevation on the line XIV in Figure 13 with parts broken away.
Figure 15:
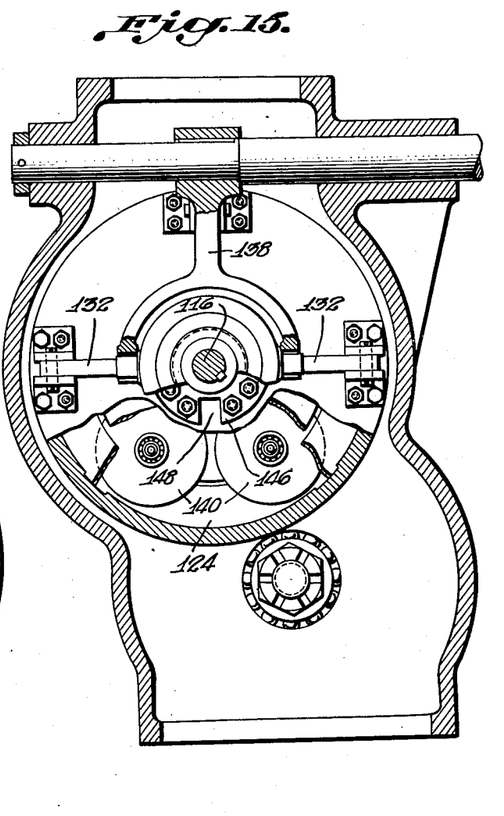
Figure 15 is a sectional end elevation on the line XV in Figure 14 with parts broken away.

The mechanism shown in Figures 13 to 15 may be regarded as having the same relation to that shown in Figures 7 and 8, as that of Figure 11 has to that of Figure 9, except that there is only one additional gear train and clutch. The corresponding parts have the same reference letters as in Figures 7 and 8, those of the additional gear train and clutch having the suffix a. The gearwheel 168 is inside the casing of the gearbox and it meshes with a gearwheel 169 on a lay shaft 171 constituting the final driven shaft. The pawl mechanism shown in Figure 14 differs from that shown in Figure 8; the pawl 174 is pivoted to a lever 175 which is itself pivoted at a fixed point 177 and is pressed downwards by a spring-pressed plunger 179 acting through an intermediate lever 181 having a curved face. As the shock upon the pawl 174 swings the lever 175 upwards, the upper edge of this lever will roll upon the curved lower edge of the lever 181 and the point of engagement of the two surfaces will move to the left thereby increasing the leverage of the spring 183 upon the lever 175. Thus, the resilient restraint of the pawl increases at a very rapid rate. The pawl is provided with side-plates 285 similar to the side-plates 284, Figure 10 and acting in the same manner.

From the description already given of the mechanism shown in Figure 1 and that shown in Figure 11 the mode of operation of the two epicyclic trains of Figure 13 will be clear; one of them or both will be disabled or put back into operation according to the requirements as regards torque and speed.

In the form of the invention shown in Figure 1, each clutch B, C or D has to transmit the whole of the torque to the driving sun-wheel of the appropriate gear train. In the other embodiments of the invention the corresponding clutches (184, 186 etc. in Figures 7 and 13, 245, 247 etc. in Figures 9 and 11) take only a part of the torque and consequently can be made smaller.

I claim:—

1. Variable-speed power transmission mechanism comprising in combination a plurality of epicyclic gear trains each having a driving member, an intermediate member and a driven member and arranged in series with the driven member of one train permanently connected to the driving member of the next train of the plurality, each train having its intermediate member free to rotate in one sense but prevented from rotating in the opposite sense, means for locking together the three elements of each train, a device associated with each gear train that is responsive to the speed thereof tending to render said locking means operative and a device associated with each gear train that is responsive to the torque transmitted thereby tending to render said locking means inoperative.

2. Variable-speed power transmission mechanism comprising in combination a plurality of epicyclic gear trains arranged end to end, each having a driving member, an intermediate member and a driven member, a connection between the driven member of one train and the driving member of the next train of the plurality comprising centrifugally-operated means carried by one of said members and adapted to advance the driving member of the second-mentioned train in relation to the driven member of the first train in opposition to the torque between said members, a clutch adapted to lock together the elements of the first train, means for preventing backward rotation of the intermediate member of each train, and an operative connection between said clutch and said centrifugally-operated means for engaging said clutch when the centrifugally-operated means advances the aforesaid driving member and to disengage said clutch when the said driving member is retarded by the opposing torque.

3. The variable-speed power transmission mechanism claimed in claim 2 in combination with a final driven shaft and a connection between the driven member of the last train of the plurality and said final driven shaft, said connection comprising centrifugally-operated means carried by said driven member and adapted to advance the final driven shaft in relation to the said driven member in opposition to the torque between said member and said shaft, a clutch adapted to lock together the elements of said train, and an operative connection between said clutch and said centrifugally-operated means for engaging said clutch when the centrifugally-operated means advances the final driven shaft and to disengage the clutch when said shaft is retarded by the opposing torque.

4. Variable speed power transmission mechanism comprising in combination a plurality of identical epicyclic gear trains arranged end to end, each having a driving member, an intermediate member and a driven member, means for preventing backward rotation of the intermediate member of each train, a plurality of identical clutches, one for each gear train, each adapted to lock together the elements of the gear train with which it is associated, a final driven shaft, a plurality of identical devices, one for each gear train, each responsive to the speed of the gear train with which it is associated and to the torque transmitted thereby and each operatively connecting the driven member of one gear train with the driving member of the next gear train and the driven member of the last gear train with the final driven shaft, each said device being operatively connected to one of said clutches to engage the clutch on an increase of speed and to disengage the clutch on an increase of torque.

5. The variable-speed power transmission mechanism claimed in claim 2 in combination with a driving shaft and a connection between said shaft and the driving member of the first train of the plurality of trains, said connection comprising centrifugally-operated means carried by said shaft and adapted to advance said driving member in relation to said shaft in opposition to the torque between the shaft and the driving member, a clutch adapted to lock together the elements of said train, and an operative connection between said clutch and said centrifugally-operated means for engaging said clutch when the centrifugally-operated means advances the driving member of the first train and to disengage the clutch when said member is retarded by the opposing torque.

6. Variable-speed power transmission mechanism comprising in combination a plurality of identical epicyclic trains arranged end to end, each having a driving member, an intermediate member and a driven member, means for preventing backward rotation of the intermediate member of each train, a plurality of identical clutches, one for each gear train, each adapted to lock tagether the elements of the gear train with which it is associated, a driving shaft, a plurality of identical devices, one for each gear train, each responsive to the speed of the gear train with which it is associated and to the torque transmitted thereby and each operatively connecting the driven member of one gear train with the driving member of the next gear train and the driving shaft with the driving member of the first gear train, each said device being operatively connected to one of said clutches to engage the clutch on an increase of speed and to disengage the clutch on an increase of torque.

7. Variable-speed power transmission mechanism comprising in combination a plurality of epicyclic gear trains arranged end to end and each comprising a driving sunwheel, differential planet pinions, a planet carrier therefor and a driven sunwheel, means for holding each planet carrier from backward rotation, a plurality of clutches one for each gear train adapted to lock the sunwheel to the planet carrier, a centrifugal device associated with each gear train responsive to the speed thereof for causing each of said clutches to engage, and a device associated with each gear train responsive to the torque transmitted thereby for causing each of said clutches to disengage.

8. Variable-speed power transmission mechanism comprising in combination a plurality of epicyclic gear trains arranged end to end and each comprising a driving sunwheel, differential planet pinions, a planet carrier therefor and a driven sunwheel, means for holding each planet carrier from backward rotation, a plurality of clutches one for each gear train adapted to lock the driving sunwheel to the planet carrier, each of said clutches comprising a plurality of annular plates carried by one clutch member and a plurality of eccentrically-pivoted discs carried by the other clutch member and interleaved with said annular plates, a centrifugal device associated with each gear train responsive to the speed thereof for causing each of said clutches to engage, and a device associated with each gear train responsive to the torque transmitted thereby for causing each of said clutches to disengage.

9. Variable-speed power transmission mechanism comprising in combination a driving shaft, a driven shaft, a plurality of epicyclic trains arranged end to end and each comprising a driving sunwheel, differential planet pinions, a planet carrier therefor, and a driven sunwheel, a plurality of concentrically arranged rotatable sleeves carrying said sunwheels, of which the driven sunwheel of each train except the last is coupled to the driving sunwheel of the next train, means for preventing backward rotation of the planet carriers, a plurality of friction clutches one for each gear train the driving members of all of which are coupled to the driving shaft and the driven members of which are coupled individually to the respective concentrically arranged sleeves, an additional friction clutch the driving member of which is coupled to the driving shaft and the driven member of which is coupled to the driven shaft, a centrifugal device associated with each gear train responsive to the speed thereof for causing each of said clutches to engage, and a device associated with each gear train responsive to the torque transmitted thereby for causing each of said clutches to disengage.

10. Variable-speed power transmission mechanism comprising in combination a plurality of epicyclic gear trains arranged end to end and each comprising a driving internally-toothed annulus planet pinions meshing therewith, a planet carrier therefor constituting the driven member and a sunwheel held against backward rotation but free to rotate forwardly, a plurality of clutches one for each gear train adapted to lock together the planet carrier and the sun pinion, a centrifugal device associated with each gear train responsive to the speed thereof for causing each of said clutches to engage, and a device associated with each gear train responsive to the torque transmitted thereby for causing each of said clutches to disengage.

11. Variable-speed power transmission mechanism comprising in combination a plurality of epicyclic gear trains each having a driving member, an intermediate member and a driven member and arranged in series with the driven member of one train permanently connected to the driving member of the next train; means including a pivoted pawl capable of yielding under resilient constraint for preventing backward rotation of the intermediate member of each epicyclic train, means for locking together the three members of each train, a device associated with each gear train responsive to the speed thereof tending to render said locking means operative and a device associated with each gear train responsive to the torque transmitted thereby tending to render said locking means inoperative.

12. Variable-speed power transmission mechanism comprising in combination a plurality of epicyclic gear trains each having a driving member, an intermediate member and a driven member and arranged in series with the driven member of one train permanently connected to the driving member of the next train, means for locking together and releasing the three members of each train in response to variations of the speed of said train and of the torque transmitted thereby, and means for preventing backward rotation of the intermediate member of each epicyclic train, comprising a pivoted arm having a convexly curved side, a pawl pivoted to the free end of said arm and extending therefrom on the side remote from its curved side, and a leaf-spring engaging said curved side in a manner to cause the point of engagement of the spring with the arm to move progressively nearer to the root of the spring as the spring yields.

13. Variable-speed power transmission mechanism comprising in combination a plurality of epicyclic gear trains each having a driving member, an intermediate member and a driven member and arranged in series with the driven member of one train permanently connected to the driving member of the next train, means for locking together and releasing the three members of each train in response to variations of the speed of said train and of the torque transmitted thereby, and means for preventing backward rotation of the intermediate member of each epicyclic train, comprising two arms substantially parallel to one another and pivoted separately at opposite ends, a pawl pivoted to one of said arms near its free end, a spring urging the other of said arms into contact with the arm first mentioned, at least one of said arms having its side which is in contact with the other arm convexly curved whereby the point of contact between the two arms moves progressively further from the pivot of the arm carrying the pawl.

JAMES EDWARD FREEBORN.